(12) United States Patent
Garzon et al.

(10) Patent No.: US 12,151,945 B2
(45) Date of Patent: Nov. 26, 2024

(54) ELECTROCHEMICAL SYNTHESIS OF AMMONIA WITH LITHIUM HALOGEN SALTS

(71) Applicant: UNM RAINFOREST INNOVATIONS, Albuquerque, NM (US)

(72) Inventors: Fernando Garzon, Albuquerque, NM (US); Shekar Balagopal, Salt Lake City, UT (US)

(73) Assignee: UNM RAINFOREST INNOVATIONS, Albuquerque, NM (US)

(*) Notice: Subject to any disclaimer, the term of this patent is extended or adjusted under 35 U.S.C. 154(b) by 413 days.

(21) Appl. No.: 16/963,760

(22) PCT Filed: Jan. 22, 2019

(86) PCT No.: PCT/US2019/014450
§ 371 (c)(1),
(2) Date: Jul. 21, 2020

(87) PCT Pub. No.: WO2019/144087
PCT Pub. Date: Jul. 25, 2019

(65) Prior Publication Data
US 2021/0094839 A1  Apr. 1, 2021

Related U.S. Application Data

(60) Provisional application No. 62/620,079, filed on Jan. 22, 2018.

(51) Int. Cl.
*C01C 1/02* (2006.01)
*B01J 23/04* (2006.01)
(Continued)

(52) U.S. Cl.
CPC ............... *C01C 1/02* (2013.01); *B01J 23/04* (2013.01); *C25B 1/00* (2013.01); *C25B 1/27* (2021.01);
(Continued)

(58) Field of Classification Search
CPC .. C25B 9/09; C25B 1/27; C25B 15/08; C01C 1/02
See application file for complete search history.

(56) References Cited

U.S. PATENT DOCUMENTS 7,314,544 B2 * 1/2008 Murphy ............... C25B 1/27
205/552
8,916,123 B2 * 12/2014 Joshi ................... C25B 1/00
423/353

(Continued)

FOREIGN PATENT DOCUMENTS

KR   101470929 B1   12/2014

OTHER PUBLICATIONS

McEnaney et al, "Ammonia synthesis from N2 and H2O using a lithium cycling electrification strategy at atmospheric pressure", Energy & Environmental Science, vol. 10, p. 1621-1630 (Jun. 27, 2017) (Year: 2017).*

(Continued)

*Primary Examiner* — Luan V Van
*Assistant Examiner* — Andrew Koltonow
(74) *Attorney, Agent, or Firm* — MH2 Technology Law Group LLP

(57) ABSTRACT

An electrolytic cell and method for synthesizing ammonia by utilizing a lithium selective membrane in the electrolytic cell and providing at least one lithium halogen salt as an electrolyte in the electrochemical process of producing ammonia. The reaction utilizes a hydrogen halide or hydrogen sulfide as a hydrogen oxidant in the process, and allows (Continued)

the regeneration of lithium halide salts that can be recycled back into the cell reaction.

9 Claims, 3 Drawing Sheets

(51) Int. Cl.
    *C25B 1/00*         (2021.01)
    *C25B 1/27*         (2021.01)
    *C25B 9/19*         (2021.01)
    *C25B 15/08*       (2006.01)
    *C25B 13/07*       (2021.01)

(52) U.S. Cl.
    CPC ............... *C25B 9/19* (2021.01); *C25B 15/08*
        (2013.01); *C25B 13/07* (2021.01)

(56) References Cited

U.S. PATENT DOCUMENTS 10,479,693 B2 *   11/2019   McEnaney ............... B01J 19/24
11,560,638 B2 *   1/2023   Schmid ................ C25B 11/031
2003/0164305 A1 *   9/2003   Denvir ...................... C25B 1/27
                                    205/552
2006/0049063 A1 *   3/2006   Murphy ................... C25B 1/27
                                    205/552
2012/0241328 A1 *   9/2012   Joshi ...................... C25B 13/04
                                    205/552
2016/0083853 A1     3/2016   Botte
2019/0161876 A1 *   5/2019   Schmid ................ C25B 11/031

OTHER PUBLICATIONS

Murakami et al, "Electrolytic Ammonia Synthesis from Hydrogen Chloride and Nitrogen Gases with Simultaneous Recovery of Chlorine under Atmospheric Pressure", Electrochemical and Solid-State Letters, vol. 8, No. 8, p. D19-D21 (Jun. 1, 2005) (Year: 2005).*
International Preliminary Report on Patentability dated Jul. 28, 2020 in corresponding PCT Application No. PCT/US2019/014450, 5 pages.
International Search Report and Written Opinion in corresponding International Application No. PCT/US2019/014450 dated Apr. 25, 2019, 6 pages.

* cited by examiner

ELECTROCHEMICAL SYNTHESIS OF AMMONIA WITH LITHIUM HALOGEN SALTS

CROSS REFERENCE TO RELATED APPLICATIONS

This application is a U.S. National Phase application of PCT/US2019/014450 filed Jan. 22, 2019, which claims the benefit of U.S. Provisional Application No. 62/620,079, filed Jan. 22, 2018, the entireties of which are incorporated herein by reference.

STATEMENT OF GOVERNMENT INTEREST

This invention was made with government support under DE-NA0003525 awarded by the Department of Energy/National Nuclear Security Administration. The government has certain rights in the invention.

TECHNICAL FIELD

The present teachings relate generally to the field of synthesizing ammonia and, more particularly, to a method for synthesizing ammonia that utilizes at least one lithium halogen salts or lithium sulfide.

BACKGROUND

Ammonia is commonly used in fertilizer production and as a building block for nitrogen containing chemicals and polymers. Having a high hydrogen content, ammonia may also function as a high energy density storage medium for hydrogen production, for example, for hydrogen used by renewable energy processes to derive electricity. Ammonia is a desirable product because it can be readily liquefied and conveniently stored in low cost steel tanks for use in a later process.

Economical synthesis of ammonia can be obtained by large-scale Haber-Bosch technology that require constant inputs of energy and reactants. Highly efficient synthesis of ammonia is limited to large-scale integrated facilities that include large process reactors and separation systems, and is difficult to downscale to smaller sized plants.

Electrolytic cell processes for ammonia production can offer higher efficiency and scalability than the Haber process. It is known that ammonia synthesis can be achieved efficiency using a lithium electrochemical process in an electrolytic cell. Lithium could react directly with atmospheric nitrogen ($N_2$) under ambient conditions to form lithium nitride ($Li_3N$), and if reacted with water, would form ammonia gas ($NH_3$) and lithium hydroxide (LiOH).

The processes utilize electrochemical cells that include membranes that transport lithium ions ($Li^+$), from the reaction of lithium hydroxide in the anode compartment, across the membrane to combine with nitrogen ($N_2$) in the cathode compartment to form lithium nitride ($Li_3N$), such as according to the known reaction below:

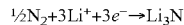

$$\tfrac{1}{2}N_2 + 3Li^+ + 3e^- \rightarrow Li_3N$$

Lithium nitride is then reacted with water to make ammonia:

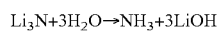

$$Li_3N + 3H_2O \rightarrow NH_3 + 3LiOH$$

Ammonia ($NH_3$) is collected as the end product of the process, and lithium hydroxide (LiOH) is recycled back to the anode compartment of the electrochemical synthesis cell. Being autocatalytic, high efficiency can be achieved with the lithium process.

However, it is well known that the lithium hydroxide product may react with the lithium metal or lithium nitride to form lithium oxide, which is a parasitic reaction that costs energy, decreases conductivity, increases melting point, and decreases the thermodynamic stability of the electrolyte. Therefore, it would be desirable to provide an improved process to synthesize ammonia that would allow high efficiency as well as high scalability of the plants, without the parasitic reactions.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present teachings relate to a method for producing ammonia comprising: providing a feed of nitrogen and a feed of hydrogen to an electrolytic cell, the electrolytic cell comprising an anode compartment, a cathode compartment, and at least one lithium halide or lithium sulfide electrolyte; reacting the feed of nitrogen to a lithium ion in the cathode compartment to form lithium nitride ($Li_3N$); reacting the feed of hydrogen to the at least one lithium halide or lithium sulfide electrolyte in the anode compartment form a hydrogen halide or hydrogen sulfide; transporting the hydrogen halide or hydrogen sulfide to the cathode compartment; reacting the hydrogen halide or hydrogen sulfide to the lithium nitride in the cathode compartment to synthesize ammonia and to form at least one lithium halide or lithium sulfide electrolyte in the cathode compartment.

In another embodiment, the at least one lithium halide electrolyte comprises at least one of lithium iodide (LiI), lithium chloride (LiCl), lithium Bromide (LiBr), lithium fluoride (LiF), or lithium sulfide ($Li_2S$), or a combination thereof. In another embodiment, the electrolytic cell further comprises a lithium ion selective membrane, and the lithium ion ($Li^+$) in the cathode compartment is transported from the anode compartment by crossing the lithium ion selective membrane. In another embodiment, the reaction to form a hydrogen oxidant also forms at least one lithium ion ($Li^+$) and releases at least one electron ($e^-$). In another embodiment, the hydrogen oxidant comprises at least one of hydrogen iodide (HI), hydrogen bromide (HBr), hydrogen chloride (HCl), hydrogen fluoride (HF), hydrogen sulfide ($H_2S$), or a combination thereof. In another embodiment, the reaction of the hydrogen oxidant to the lithium nitride in the cathode compartment is performed in a separate reactor vessel under different temperature and pressure conditions than the electrolytic cell. In another embodiment, the method further comprises transporting the at least one lithium halide or lithium sulfide electrolyte formed in the cathode compartment to the anode compartment. In another embodiment, the method is performed at a temperature range of between about 200° C. to about 940° C.

The present teachings also relate to an electrolytic cell for the production of ammonia comprising: an anode compartment; a cathode compartment; a lithium selective membrane; and at least one lithium electrolyte comprising a lithium halide or lithium sulfide salt.

In another embodiment, the lithium halide salt is selected from one of lithium iodide (LiI), lithium chloride (LiCl), lithium Bromide (LiBr), lithium fluoride (LiF), or lithium sulfide ($Li_2S$), or a combination thereof. In another embodiment, the electrolytic cell further includes a hydrogen oxidant that is selected from one of hydrogen iodide (HI), hydrogen bromide (HBr), hydrogen fluoride (HF), hydrogen sulfide ($H_2S$), hydrogen chloride (HCl), or a combination thereof. In yet another embodiment, the electrolytic cell is at a temperature range of between about 200° C. to about 940° C.

Some advantages of the embodiments will be set forth in part in the description which follows, and in part will be understood from the description, or may be learned by practice of the invention. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

The conventional electrochemical process for ammonia production includes lithium hydroxide as an end product that is recycled back into the process, but lithium hydroxide is known to react with lithium metal and lithium nitride to form lithium oxide, which is a parasitic reaction that costs energy, decreases conductivity, increases melting point, and decreases the thermodynamic stability of the electrolyte. The present teachings utilize lithium halides or lithium sulfide as electrolytes in the electrochemical production of ammonia, which can be recycled back into the process. By utilizing lithium halides or lithium sulfide instead of lithium hydroxide in the process, the parasitic reaction of forming lithium oxide is prevented in the ammonia production process. The ammonia production of the present teachings is thermodynamically stable, and allows regeneration of the lithium halides or lithium sulfide to be continuously recycled back into the cell as electrolytes in the ammonia production process.

Figure 1:
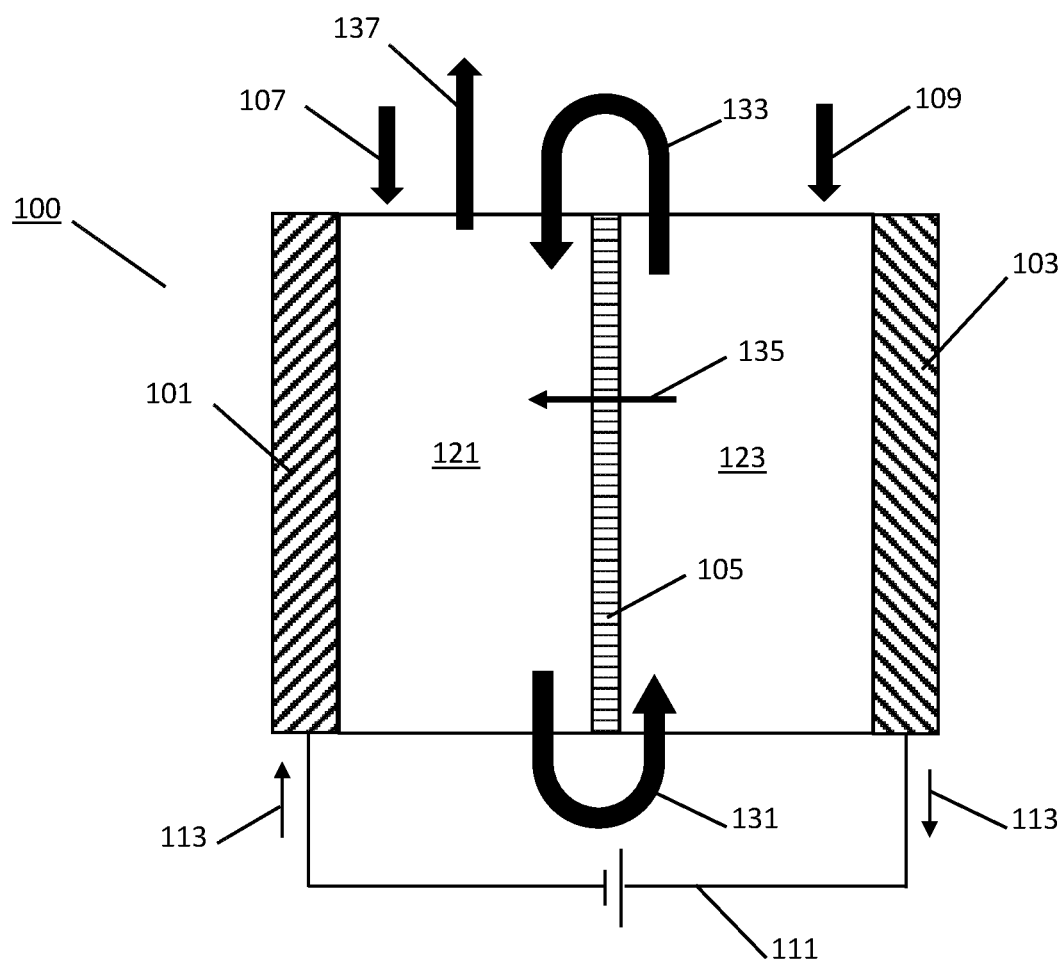
FIG. 1 is a schematic cross section depicting an electrolytic cell in accordance with an embodiment of the present teachings.

FIG. 1 shows a schematic cross-sectional depiction of an embodiment of the present teachings. Electrolytic cell 100 includes a cathode 101, an anode 103, and a membrane 105. The membrane is preferably a lithium selective membrane that selectively allows lithium ($Li^+$) ions to pass through between the anode compartment 123 and the cathode compartment 121 of the electrolytic cell 100. Example of lithium ion conducting membranes may include material such as lithium beta alumina, lithium beta prime-prime alumina, lithium zirconium phosphates, lithium garnets, lithium tantalum titanium oxides, and a combination thereof.

In an embodiment process, a feed of nitrogen ($N_2$) 107 is provided to the cathode compartment 121, and a feed of hydrogen ($H_2$) 109 is provided to the anode compartment 123. The feeds of nitrogen ($N_2$) 107 and hydrogen ($H_2$) 109 are provided to the electrolytic cell via mechanisms not depicted in the figures, such as via pipes, tubes, and any other suitable mechanisms that may be deemed appropriate for manufacturing ammonia electrochemically.

The feed of hydrogen ($H_2$) 109 can be provided to the cell 100 as pure hydrogen gas, or also provided as being derived from water. In the reaction process, the amount of nitrogen and hydrogen feeds can be adjusted accordingly to optimize ammonia yield. Minimum values are dictated by the ammonia reaction stoichiometry.

The cell 100 is further supplied with at least one lithium halide salt as an electrolyte in the cell reactions, specifically as a combination of lithium and a halogen, such as lithium iodide (LiI), lithium chloride (LiCl), lithium bromide (LiBr), lithium fluoride (LiF), or lithium sulfide ($Li_2S$), or a combination thereof. There may be additional electrolytes in the cell 100 that comprise additional types of salts that modify the melting point, viscosity, conductivity or other properties of the electrolytes. Examples of additional types of salts suitable as an electrolyte include, but are not limited to, alkali or alkaline earth halogen salts.

The amount of lithium electrolytes used in the cell 100 is determined by the melting points of the lithium halide (LiX) or lithium sulfide salts that are provided to the cell 100. The melting behavior and the electrochemical stability of the lithium halide or lithium sulfide containing electrolyte dictate the composition of lithium halide or lithium sulfide electrolyte mixtures. The non-lithium halide electrolytes must also resist decomposition within the temperature and electrochemical potentials that the molten salts are subjected to.

Temperature range of the reaction in the cell 100 is dictated by the stability and melting behavior of the materials used, such as the combination of lithium halide electrolytes or lithium sulfide electrolytes. A temperature range in the cell 100 may be between about 200° C. to about 940° C. (about 392° F. to about 1724° F.), preferably between about 400° C. to about 700° C., and more preferably between about 450° C. to about 555° C.

In the cathode compartment 121, the feed of nitrogen ($N_2$) 107 reacts with the lithium ions ($Li^+$) 135 that are formed in (and transported across the membrane 105 from) the anode compartment 123, and the reaction forms lithium nitride ($Li_3N$). In the anode compartment 123, the feed of hydrogen ($H_2$) 109 reacts with a lithium halide or lithium sulfide (LiX) electrolyte to form a hydrogen oxidant 133 such as a hydrogen halide (HX) comprising hydrogen iodide (HI), hydrogen bromide (HBr), hydrogen chloride (HCl), hydrogen fluoride (HF), or a hydrogen sulfide oxidant ($H_2S$). The hydrogen oxidant 133 is transported from the anode compartment 123 to the cathode compartment 121. In the cathode compartment 121, the hydrogen oxidant 133 reacts with the lithium nitride ($Li_3N$) to form ammonia ($NH_3$) 137 and lithium halide or lithium sulfide (LiX) 131. The lithium or lithium sulfide (LiX) 131 is recycled back into the anode compartment 123 to react with the feed of hydrogen gas ($H_2$) 109 to form the hydrogen oxidant 133, the lithium ion ($Li^+$) 135, and a flow of electrons 113 that is transported through the circuit 111 from the anode 103 towards the cathode 101. The hydrogen oxidant 133 is transported from the anode compartment 123 to the cathode compartment 121, and the lithium ion ($Li^+$) is transported across the lithium selective membrane 105 from the anode compartment 123 to the cathode compartment 121 for a continuous production of ammonia in the cell process. Ammonia ($NH_3$) 137 synthesized in the cell process is removed from the cell 100.

The ammonia production process of the present teachings is desirable because the net feedstocks may be a simple feed of hydrogen gas and nitrogen gas, or can derive hydrogen from water in the reactions. The lithium halide or lithium sulfide formed in the cell may be recycled back into the process to regenerate the lithium halide or lithium sulfide electrolytes. The reaction between the hydrogen halide (HX) or hydrogen sulfide oxidant ($H_2S$) and the lithium nitride ($Li_3N$) to form ammonia and lithium halide or lithium sulfide (LiX) requires low energy and is thermodynamically stable. Using a halide or sulfide cycle in the electro-synthesis process of ammonia simplifies the salt electrolysis portion of the process because lithium halide or lithium sulfide salts are highly soluble and thermodynamically stable in the reaction.

Example: Ammonia Synthesis Using a Lithium Nitride—Hydrogen Iodide Process

As an example of the present teachings, an electro-synthesis of ammonia has been performed utilizing lithium iodide (LiI) as an electrolyte, and hydrogen iodide is formed as the hydrogen halide in the reactions. In the process, hydrogen and nitrogen have been feed to an electrolytic cell that includes a lithium ion selective membrane, and the cell has been supplied with lithium iodide (LiI) as electrolytes. The reaction produces hydrogen iodide (HI) as the hydrogen halide that reacts with lithium nitride ($Li_3N$) which is electro-synthesized in the cathode compartment. Hydrogen iodide (HI) is a desirable oxidant because it requires low process energy. For example, separation of the hydrogen iodide (HI) molecule may be performed via pressure or temperature swing adsorption. Lithium iodide (LiI) can also be recycled back into the reactions.

The electrochemical synthesis of ammonia using a lithium nitride-hydrogen iodide cycle is illustrated as follows:

| Cathode Reaction | |
|---|---|
| $3Li^+ + 3e^- \leftrightarrow 3Li$ | 0.0 V |
| $3Li + \frac{1}{2}N_2 \longleftrightarrow Li_3N$ | 0.3 V |
| Net: $3Li^+ + \frac{1}{2}N_2 + 3e^- \longleftrightarrow Li_3N$ | 0.3 V |
| Thermal Reaction : | |
| $Li_3N + 3HI \leftrightarrow 3LiI + NH_3$ | $\Delta H_{450C} = -725$ kJ |
| Anode Reaction | |
| 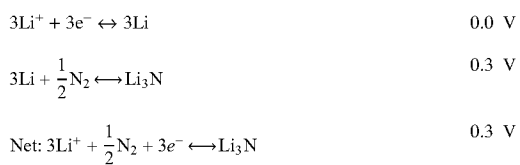 | 2.66 V |
| 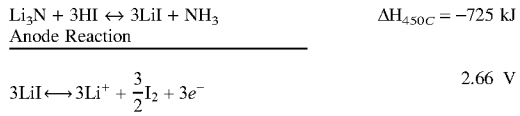 | 0.12 V, $\Delta G_{448C} = -35.4$ kJ |
| Net: $\frac{3}{2}H_2 + 3LiI \longleftrightarrow 3Li^+ + 3HI + 3e^-$ | 2.54 V |
| Overall: $\frac{3}{2}H_2 + \frac{1}{2}N_2 \longleftrightarrow NH_3$ | −2.24 V |

In another example of the present teachings, an electro-synthesis of ammonia can be performed utilizing lithium bromide (LiBr) as an electrolyte, and hydrogen bromide as the hydrogen oxidant in the reactions. In a further example of the present teachings, an electro-synthesis of ammonia can be performed utilizing lithium sulfide ($Li_2S$) as an electrolyte, and hydrogen sulfide ($H_2S$) as the hydrogen oxidant in the reactions. In yet another example of the present teachings, an electro-synthesis of ammonia can be performed utilizing lithium fluoride (LiF) as an electrolyte, and hydrogen fluoride as the hydrogen oxidant in the reactions.

Similar reaction stoichiometry and thermodynamic calculations may be presented for other lithium halides, such as lithium bromide, lithium sulfide, and lithium fluoride. It is believed that, for example, a lithium iodide cycle requires less electrical energy input than a lithium bromide cycle, and more stable than a lithium sulfide cycle. Although it is known that a conventional lithium hydroxide cycle performed in an electrolytic cell requires even less energy than a lithium iodide cycle, lithium hydroxide reacts with lithium metal to form lithium oxide and lithium hydride, which prevents electrolysis of the salt to regenerate the lithium metal for recycling back into the cycle. In contrast, the embodiments of the present teachings utilize lithium halides, which allow regeneration of the lithium halides to be recycled back into the cell for continuing the ammonia production process.

Figure 2:
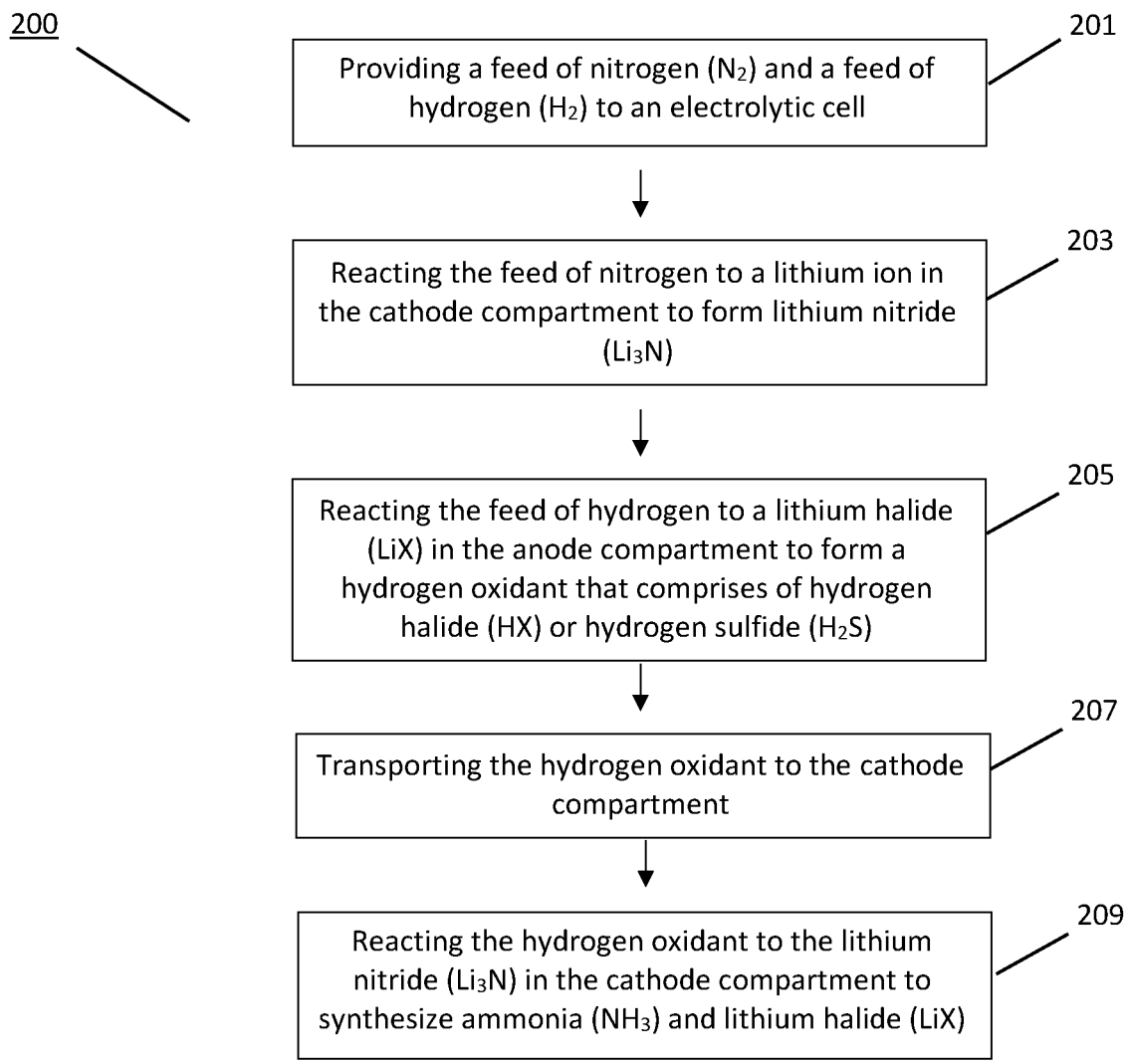
FIG. 2 is a flow chart depicting steps of a method of producing ammonia in accordance with another embodiment of the present teachings.

A basic method of an embodiment of the present teachings is shown in the flow chart in FIG. 2. A method 200 for synthesizing ammonia in an electrolytic cell includes:

201 Providing a feed of nitrogen ($N_2$) and a feed of hydrogen ($H_2$) to an electrolytic cell, which can be both provided as pure gas via pipes and other instruments, or can be derived from other molecules and chemicals, such as hydrogen that is derived from water;

203 Reacting the feed of nitrogen ($N_2$) to a lithium ion in the cathode compartment to form lithium nitride ($Li_3N$), the lithium ion (Li+) is produced in the anode compartment of the electrolytic cell and transported across a lithium selective membrane of the electrolytic cell to the cathode compartment: ½ $N_2$+$3Li^+$+$3e^-$→$Li_3N$;

205 Reacting the feed of hydrogen to a lithium halide or lithium sulfide (LiX) in the anode compartment to form a hydrogen halide or hydrogen sulfide oxidant (HX), and also produces the lithium ions ($Li^+$) that are being transported across the membrane of the electrolytic cell, and electrons ($e^-$) that are also transported from the anode compartment to the cathode compartment: 3/2 $H_2$+3LiX→$3Li^+$+3HX+$3e^-$;

207 Transporting the hydrogen halide or hydrogen sulfide (HX) oxidant ($H_2S$) that is formed in the anode compartment towards the cathode compartment for further reactions; and

209 Reacting the hydrogen halide or hydrogen sulfide oxidant (HX) that is transported from the anode compartment to the lithium nitride ($Li_3N$) in the cathode compartment to synthesize ammonia and lithium halide: $Li_3N$+3HX→$NH_3$+3LiX.

The lithium halides or lithium sulfide (LiX) formed as one of the end products in the ammonia synthesis reaction can be recycled back into the process for a continuous production of ammonia by further transporting the lithium halides or lithium sulfide (LiX) from the cathode compartment into the anode compartment to continue the process of producing ammonia.

Figure 3:
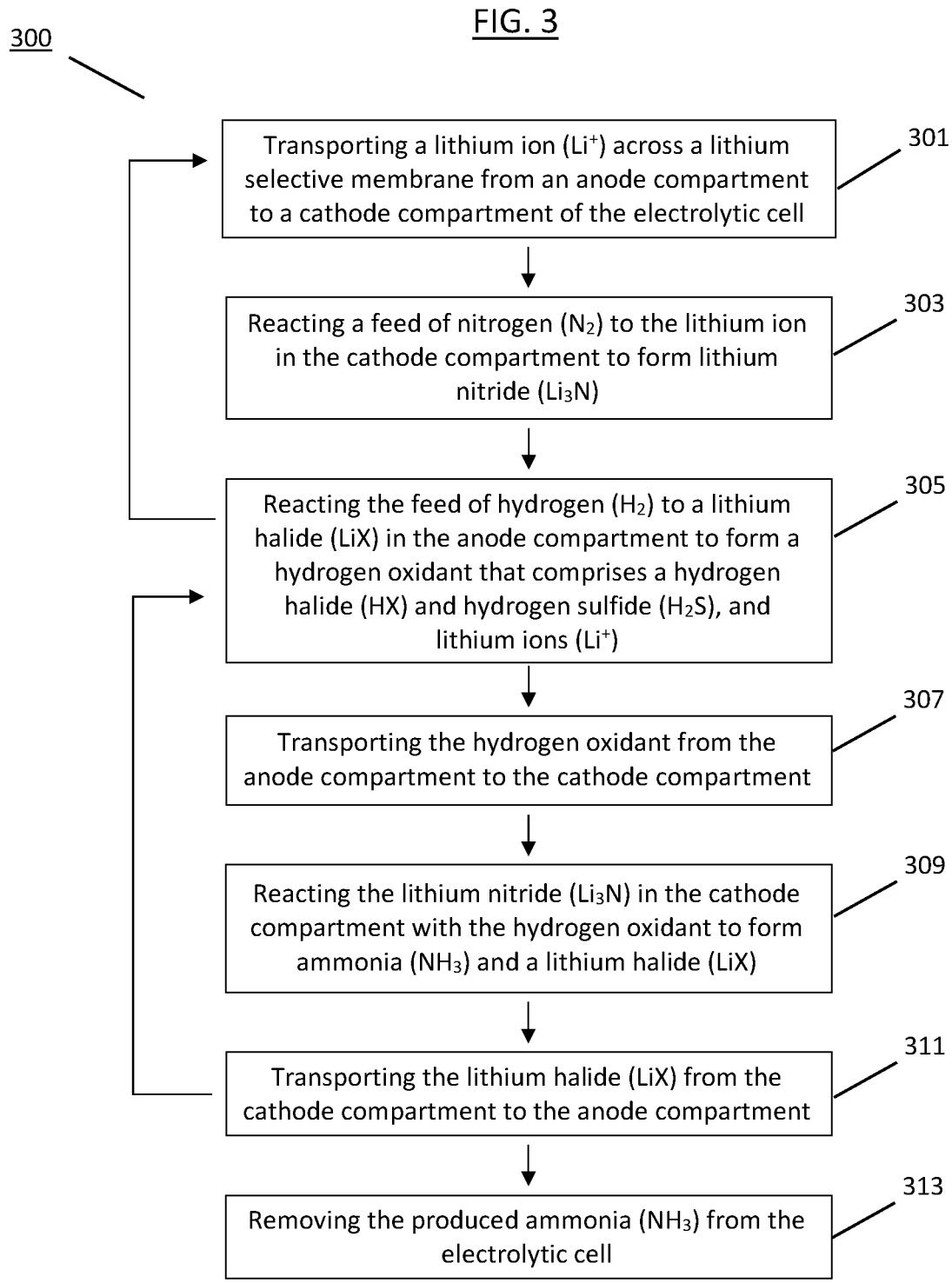
FIG. 3 is a flow chart depicting steps of another method of producing ammonia in accordance with another embodiment of the present teachings.

Another embodiment method of producing ammonia according to the present teachings is shown in FIG. 3. A method 300 for synthesizing ammonia in an electrolytic cell includes:

301 Transporting a lithium ion (Li$^+$) across a lithium selective membrane from an anode compartment of the electrolytic cell to a cathode compartment of the same electrolytic cell, the lithium ion is produced in the anode compartment during the same cell process (such as in step 305), and the membrane may include material such as lithium beta alumina, lithium beta prime-prime alumina, lithium zirconium phosphates, lithium garnets, lithium tantalum titanium oxides, and a combination thereof;

303 Reacting a feed of nitrogen (N$_2$) to the lithium ion in the cathode compartment to form lithium nitride (Li$_3$N), the feed of nitrogen can be provided to the cathode compartment as a gas or as being derived from other molecules and chemicals, and the reaction to form lithium nitride is: ½ N$_2$+3Li$^+$+3$e^-$→Li$_3$N;

305 Reacting a feed of hydrogen (H$_2$) to a lithium halide or lithium sulfide (LiX) electrolyte in the anode compartment of the electrolytic cell to form a hydrogen halide or hydrogen sulfide oxidant (HX) and lithium ions (Li$^+$), the feed of hydrogen can be provided to the anode compartment as a gas or as being derived from other molecules and chemicals (such as from water molecules), the produced lithium ions (Li$^+$) are transported across the lithium selective membrane and the released electrons are transported from the anode compartment towards the cathode compartment through a circuit transported through a circuit to further the cell process as described in step 301 and 303, and the reaction to form hydrogen halide or hydrogen sulfide is: 3/2 H$_2$+3LiX→3Li$^+$+3HX+3$e^-$;

307 Transporting the hydrogen halide or hydrogen sulfide (HX) oxidant that is formed in the anode compartment towards the cathode compartment to further the cell process to produce ammonia;

309 Reacting the lithium nitride (Li$_3$N) formed in the cathode compartment with the hydrogen halide or hydrogen sulfide oxidant (HX) that is transported from the anode compartment to form ammonia (NH$_3$) and a lithium halide or lithium sulfide (LiX), 311 Transporting the lithium halide or lithium sulfide (LiX) produced as one of the end products of the ammonia synthesis reaction from the cathode compartment to the anode compartment, the lithium halide or lithium sulfide (LiX) is the electrolyte that has been a part of the cell reactions, such as the reaction to form hydrogen halide or hydrogen sulfide as described during step 305; and 313 Removing the produced ammonia (NH$_3$) from the electrolytic cell as an end product.

The lithium halide or lithium sulfide (LiX) electrolytes in the present teachings is comprised of at least one of lithium iodide (LiI), lithium chloride (LiCl), lithium bromide (LiBr), lithium fluoride (LiF), lithium sulfide (Li$_2$S), or a combination thereof. The hydrogen oxidant in the cell process is comprised of a hydrogen halide of at least one of hydrogen iodide (HI), hydrogen bromide (HBr), hydrogen chloride (HCl), hydrogen fluoride (HF), or hydrogen sulfide oxidant (H$_2$S), which can be dependent upon the lithium halide or lithium sulfide that is utilized in the cell process.

The methods 200 and 300 may be performed at a temperature range of between about 200° C. to about 940° C. (about 392° F. to about 1724° F.), preferably between about 450° C. to about 650° C., and more preferably between about 450° C. to about 555° C.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. A method for producing ammonia comprising:
providing a feed of nitrogen and a feed of hydrogen to an electrolytic cell, the electrolytic cell comprising an anode compartment, a cathode compartment, and an electrolyte, wherein the electrolyte comprises a lithium halide and one of a bromide, an iodide salt or both a bromide and an iodide salt;
reacting the feed of nitrogen to a lithium ion in the cathode compartment to form lithium nitride ($Li_3N$);
reacting the feed of hydrogen to the at least one lithium halide electrolyte in the anode compartment to form a hydrogen oxidant;
transporting the hydrogen oxidant to the cathode compartment;
reacting the hydrogen oxidant to the lithium nitride in the cathode compartment to synthesize ammonia and to form at least one lithium halide electrolyte in the cathode compartment
transporting the at least one lithium halide electrolyte formed in the cathode compartment to the anode compartment to recycle the at least one lithium halide electrolyte;
reacting the at least one recycled lithium halide electrolyte with the feed of hydrogen to form additional regenerated hydrogen oxidant in the anode compartment; and
transporting the additional regenerated hydrogen oxidant from the anode compartment to the cathode compartment.

2. The method of claim 1, wherein the at least one lithium halide electrolyte comprises at least one of lithium iodide (LiI), lithium chloride (LiCl), lithium Bromide (LiBr), lithium fluoride (LiF), lithium sulfide ($Li_2S$), or a combination thereof.

3. The method of claim 1, wherein the electrolytic cell further comprises a lithium ion selective membrane, and the lithium ion ($Li^+$) in the cathode compartment is transported from the anode compartment by crossing the lithium ion selective membrane.

4. The method of claim 1, wherein the reaction to form a hydrogen oxidant also forms at least one lithium ion ($Li^+$) and releases at least one electron ($e^-$).

5. The method of claim 1, wherein the hydrogen oxidant comprises at least one of hydrogen iodide (HI), hydrogen bromide (HBr), hydrogen chloride (HCl), hydrogen fluoride (HF), hydrogen sulfide ($H_2S$), or a combination thereof.

6. The method of claim 1, wherein the method is performed at a temperature range of between about 200° C. to about 940° C.

7. A method for producing ammonia comprising:
providing a feed of nitrogen and a feed of hydrogen to an electrolytic cell, the electrolytic cell comprising an anode compartment, a cathode compartment, and an electrolyte, wherein the electrolyte comprises a lithium halide and one of a bromide, an iodide salt or both a bromide and an iodide salt;
reacting the feed of nitrogen to a lithium ion in the cathode compartment to form lithium nitride ($Li_3N$);
reacting the feed of hydrogen to the at least one lithium halide electrolyte in the anode compartment to form a hydrogen oxidant;
transporting the hydrogen oxidant to a separate reactor vessel;
further reacting the hydrogen oxidant to the lithium nitride in the separate reactor vessel to synthesize ammonia and to form at least one lithium halide electrolyte in the separate reactor vessel;
transporting the at least one lithium halide electrolyte formed in the separate reactor vessel to the anode compartment to recycle the at least one lithium halide electrolyte;
reacting the at least one recycled lithium halide electrolyte with the feed of hydrogen to form additional regenerated hydrogen oxidant in the anode compartment; and
transporting the additional regenerated hydrogen oxidant from the anode compartment to the cathode compartment.

8. The method of claim 7, wherein the reaction of the hydrogen oxidant to the lithium nitride is performed in a separate reactor vessel under different temperature and pressure conditions than in the electrolytic cell.

9. The method of claim 1, wherein no lithium hydroxide is recycled back into the cell.

* * * * *

UNITED STATES PATENT AND TRADEMARK OFFICE
CERTIFICATE OF CORRECTION

| | | |
|---|---|---|
| PATENT NO. | : 12,151,945 B2 | Page 1 of 1 |
| APPLICATION NO. | : 16/963760 | |
| DATED | : November 26, 2024 | |
| INVENTOR(S) | : Fernando Garzon et al. | |

It is certified that error appears in the above-identified patent and that said Letters Patent is hereby corrected as shown below:

In the Specification

Column 1, Lines 17-18: "DE-NA0003525 awarded by the Department of Energy/National Nuclear Security Administration." should be -- DE-AR0000949 awarded by the Department of Energy. --.

Signed and Sealed this
Seventh Day of January, 2025

Derrick Brent
*Acting Director of the United States Patent and Trademark Office*